May 29, 1956
J. N. FELGER
2,747,974
MIXER
Filed Aug. 18, 1953
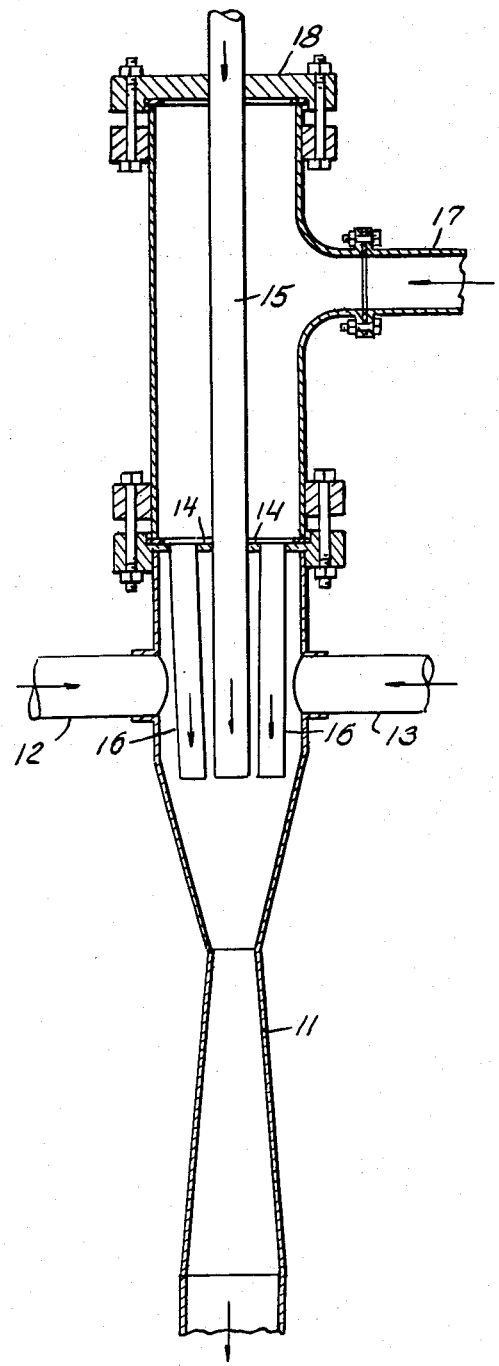
INVENTOR
JAMES N. FELGER
BY
Adams, Forward and McLean
ATTORNEYS

United States Patent Office 2,747,974
Patented May 29, 1956

2,747,974
MIXER

James N. Felger, Kenmore, N. Y., assignor to Olin Mathieson Chemical Corporation, a corporation of Virginia Application August 18, 1953, Serial No. 374,913

1 Claim. (Cl. 23—284)

My invention relates to improvements in the manufacture of hydrazine by the Raschig process. More particularly, my invention concerns an improved mixer for carrying out the synthesis reaction of chloroamine with excess ammonia to form hydrazine.

In one commercial modification of the Raschig process for the synthesis of hydrazine, an aqueous chloroamine solution is prepared by the low temperature reaction of aqueous hypochlorite solution with aqueous ammonia as a first step. The chloroamine solution is subsequently treated with a large excess of ammonia in order to form hydrazine. One of the difficulties in manufacturing hydrazine commercially is that of avoiding losses of the unstable chloroamine by decomposition or side reactions. Bernard H. Nicolaisen application Serial No. 218,212, filed March 29, 1951, now abandoned, discloses the importance in the second step of the Raschig synthesis of introducing a large excess of ammonia to a cold chloroamine solution as soon as the latter has been prepared. To avoid side reactions, rapid introduction of ammonia and the prevention of back mixing is essential. In addition, it is disclosed that, as rapidly as possible, the reaction mixture should be heated to temperatures of about 125–155° C. under pressures of about 300–450 p. s. i. to maintain the ammonia in solution. After mixing, the solution advantageously flows through an extended tubular reactor to provide suitable contact time of up to about 30 seconds before processing the liquor for recovery of hydrazine.

The apparatus of my invention provides means for effectively mixing the cold chloroamine solution with excess ammonia and elevation of the temperature of the mixture to a controlled high temperature as rapidly as possible. My mixer comprises a generally cylindrical conduit provided with a Venturi-shaped constriction and also provided with tubes in the side walls for the introduction of the chloroamine solution and a plurality of inlet tubes for the introduction of liquid and gaseous ammonia into the Venturi throat. With my construction, both the chloroamine solution and ammonia reactants can be pumped in under suitable pressure and are subjected to violent mixing and immediate removal to the elongated reaction zone.

The mixer of my invention can be more thoroughly understood by reference to the accompanying drawing. In the drawing, the numeral 11 designates the generally cylindrical conduit which is provided with a Venturi-shaped constriction, as shown. The angle of the entrance portion of the Venturi is, for example, about 30°, and the angle of the exit portion is, for example, about 7°. The entrance portion of the mixer is provided with side tubes or pipes 12 and 13 through which chloroamine solution can be introduced at a point slightly before the Venturi throat. Upstream from the Venturi throat is positioned a plate 14 which extends across the mixer. Extending through this plate is a central inlet tube or pipe 15, through which liquid ammonia can be injected and surrounding which is a plurality of additional tubes or pipes 16. Pipes 15 and 16 extend into the throat of the Venturi past the side tubes 12 and 13 and are directed generally toward the constriction of the Venturi. The mixer is also provided with side tube or pipe 17 which can be appropriately used for the introduction of gaseous ammonia into the Venturi throat through the pipes 16 and also with a closure 18, suitably a stuffing box, through which the pipe 15 extends.

The apparatus of my invention is especially appropriate for the mixing of a relatively large proportion of a soluble gas with a smaller proportion of an aqueous liquid under conditions of violent agitation. Because of this construction it is possible to introduce the required excess of ammonia rapidly with adequate temperature control. This results in improved yields of hydrazine. The mixer of my present invention is especially advantageous for use in conjunction with the apparatus described in my copending application No. 375,026, filed of even date herewith, entitled "Apparatus," which describes a valuable device suitable for use in reacting aqueous hypochlorite solution and aqueous ammonia to produce an aqueous solution of chloroamine.

I claim:

A mixer suitable for use in rapidly mixing vapor phase ammonia, liquid phase ammonia and an aqueous solution of chloroamine in the Raschig synthesis for the production of hydrazine comprising a conduit composed of a cylindrical portion and a venturi portion, the cylindrical portion being divided into two sections by a transverse plate, the section of the cylindrical portion furthest removed from the venturi portion having an end closure member, a pipe having its axis substantially perpendicular to the axis of the conduit in communication with the conduit at a point between the plate and closure member suitable for injecting vapor phase ammonia into the conduit space between the closure member and plate, a pipe having its axis substantially perpendicular to the axis of the conduit and in communication with the conduit at a point between the venturi portion and the plate suitable for injecting an aqueous solution of chloroamine into the conduit, a first tube having its axis substantially coinciding with the axis of the conduit extending through the end closure member and plate and into the venturi portion of the conduit suitable for injecting liquid phase ammonia into the venturi portion of the conduit, and at least one second tube extending from the plate and into the venturi portion of the conduit whereby vapor phase ammonia present in the conduit between the closure member and the plate can flow into the venturi portion of the conduit.

References Cited in the file of this patent
UNITED STATES PATENTS

| | | |
|---|---|---|
| 945,143 | Szamek | Jan. 4, 1910 |
| 1,835,283 | Creckmer | Dec. 8, 1931 |
| 2,129,269 | Furlong | Sept. 6, 1938 |